United States Patent

[11] 3,600,788

[72] Inventor Walter R. Armand
 1320 Speer Blvd., Denver, Colo. 80204
[21] Appl. No. 842,281
[22] Filed July 16, 1969
[45] Patented Aug. 24, 1971

[54] RUBBER BAND STRETCHING TOOLS
 3 Claims, 7 Drawing Figs.
[52] U.S. Cl.................................................. 29/229,
 29/235
[51] Int. Cl................................................. B23p 19/04
[50] Field of Search........................... 29/229,
 235; 81/129

[56] References Cited
UNITED STATES PATENTS
2,601,547  6/1952  Minock ........................ 128/303

Primary Examiner—Andrew R. Juhasz
Assistant Examiner—Leon Gilden
Attorney—R. H. Galbreath ABSTRACT: An outer cylindrical sleeve rotatably positioned about an inner cylindrical sleeve, each sleeve being provided with a radially projecting handle, said handles being capable The alignment to receive a contracted rubber band and capable of relative rotation to stretch said band into a circular ring peripherally encircling said outer cylindrical sleeve, provided with trigger means for urging said stressed ring from said outer sleeve to a contracted position about a work piece positioned within said inner cylindrical sleeve. wire

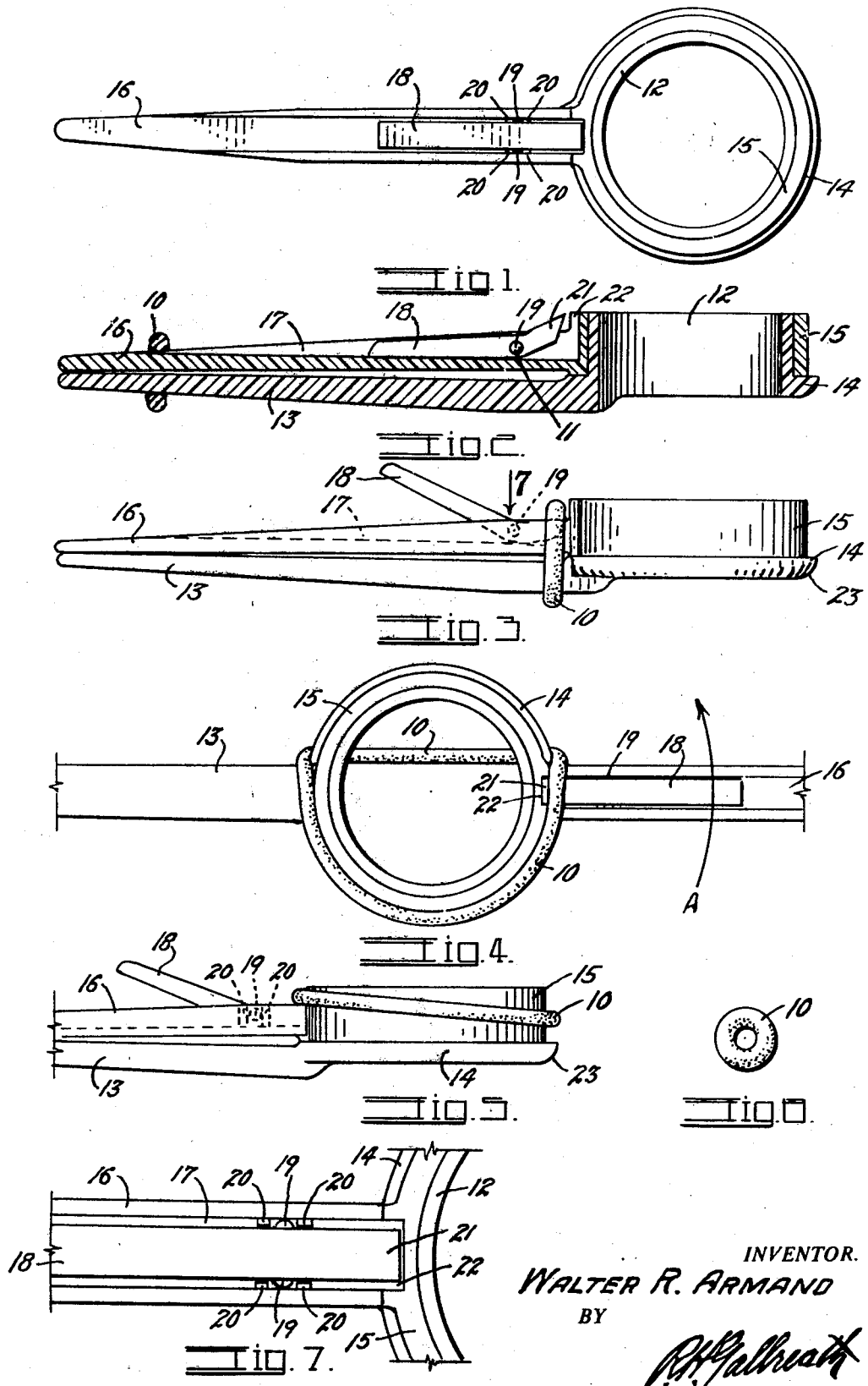

RUBBER BAND STRETCHING TOOLS

This invention relates to a device for stretching relatively heavy rubber bands and maintaining them in an enlarged circular open position, so that the bands can be readily and accurately positioned in clamping position on an article to be clamped by the band and instantly released so that the band will uniformly contract into clamping relation about the article.

One of the principal uses of the invention is in animal husbandry for the removal of horns and tails and for the castration of domestic animals such as calves and lambs. One method for accomplishing the latter tasks is to place a relatively tight rubber band about the base of the part to be emasculated so as to cut off the circulation of the blood thereto to cause the part to atrophy for later removal. Such bands are extremely powerful and it is exceedingly difficult to apply the necessary stretching tension thereto while positioning the band at the desired location on the animal.

Other uses for the invention are: the application of rubber gaskets such as "0-Rings" to various machine parts; the application of closing bands to sacks or bags or various commodities; and the application of elastic sealing bands to pipe and hose fittings and the like.

The principal object of the invention is to provide a simple, economical unitary hand tool which will readily form a large open ring from a relatively small powerful rubber band and which will retain the ring open so that the band can be easily placed in the desired position and released into place with one hand leaving the other hand free for supporting the work.

A further object is to provide a tool of the above character which will be completely nonmetallic and which will have no sharp corners or edges so as to avoid injury and damage to the work to which the band is being applied.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a top plan view of the improved band-stretching tool;

FIG. 2 is a medial, longitudinal section therethrough, taken on the line 2—2, FIG. 1, showing a rubber band 10 in its initial position on the tool;

FIG. 3 is a side elevational view thereof, showing the rubber band 10 in its second position on the tool;

FIG. 4 is a fragmentary plan view illustrating the tool in a partially actuated (180°) position to be later described;

FIG. 5 is a fragmentary side view of the tool showing its fully actuated position with the band 10 completely expanded to the annular open position ready for release;

FIG. 6 is a detail face view of the band 10 in its normal unstretched condition; and FIG. 7 is an enlarged fragmentary detail view looking in the direction of the arrow "7" in FIG. 3.

DETAIL STRUCTURE

The tool employs a cylindrical internal sleeve 12, of sufficient diameter to surround the work upon which the tool is to be used, from the bottom of which a tapering lower handle 13 radially projects. An annular base flange 14 surrounds the bottom of the internal sleeve and projects circumferentially outward therefrom in the plane of the handle 13. The lower annular edge of the flange 14 is rounded as shown at 23.

A cylindrical external sleeve 15 rotatably surrounds the internal sleeve 12 and slidably rests upon the upper surface of the flange 14. A similarly tapering upper handle 16 projects radially from the external sleeve 15. The upper handle can be rotated about the axis of the sleeves 12 and 15 so that it can be brought over and into alignment with the lower handle 13, as shown in FIG. 1. The upper surface of the upper handle 16 is longitudinally indented to provide an elongated trigger channel 17 in which an elongated, rockerlike trigger element 18 is positioned. The trigger element is provided with pivot bosses 19 in its opposite sides which fit between vertical ridges 20 molded in the sides of the trigger channel 17, as shown in FIG. 7, to prevent longitudinal movement of the trigger element in the channel 17 yet allow free pivotal movement therein. The trigger element projects forwardly at an obtuse angle to provide a prying foot 21 which extends into a receiving notch 22 in the external sleeve 15. The intersection of the foot 21 with the trigger element 18 provides a fulcrum point 11 (see FIG. 2) upon which the trigger assembly may reciprocally rock back and forth.

OPERATION

The band 10 is slipped over the extremities of the handles 13 and 16 and is rolled forwardly over the trigger element 18 so as to depress the foot 21 and raise the trigger element 18 as shown in FIG. 3.

The lower handle 13 is now held stationary in one hand and the upper handle 16 is rotated counterclockwise, as indicated by the arrow "A" in FIG. 4, by the other hand to cause the rotative movement to stretch the upper reach of the band arcuately around the external sleeve 15 while the lower reach of the band rolls downwardly beneath the rounded edge 23 to a transverse position across and below the flange 14 as shown by the 180° rotation in FIG. 4.

The rotation is continued a full 360° causing the lower reach of the band to snap upwardly over the rounded edge 23 to a tensed circular position about the external sleeve 15 and above the prying foot 21 as shown in FIG. 5. Both handles are now grasped in one hand so that the circular open center of the internal sleeve 12 can be conveniently positioned circumferentially about the work to be clamped. When the proper positioning has been attained, the trigger element 18 is depressed by the thumb of the hand to elevate one side of the expanded ring above the top of the external sleeve and allow the inherent resiliency of the stressed band to snap it closed about the work and the job is completed.

It will be noted that when the band is in the position of FIG. 5 it is completely supported in the open tensed position by the external sleeve 15 and its handle 16 so that the internal sleeve 12 and its handle 13 may be removed if such removal is found to expedite the final placement. This also enables a single internal sleeve and handle to be used to equip a plurality of external sleeves and handles with the stressed open bands. Thus, the workmen doing the final applying can be furnished with a plurality of upper portions containing prestressed bands if field conditions can be facilitated thereby.

While a specific form of the invention has been described and illustrated herein, it is to be understood that the same may be varied within the scope of the appended claims, without departing from the spirit of the invention.

Having thus described the invention what I claim and desire to be secured by Letters Patent is:

1. A rubber band stretching tool comprising:
   a. a hollow internal cylindrical sleeve;
   b. a hollow external cylindrical sleeve rotatably surrounding said inner sleeve, the tops of said sleeves being in substantial alignment;
   c. a first handle secured to and radially projecting from the lower extremity of said inner sleeve;
   d. a second handle secured to and projecting radially from the lower extremity of said external sleeve, above said first handle, said handles being capable of substantially parallel alignment so as to simultaneously pass through the open center of a contracted rubber band so that rotational separation of said handles about the axis of said sleeves will stretch said band and circumferentially position said stressed band about said external sleeve; and e. trigger means mounted on said second handle actuatable to engage the stressed band on said external sleeve to urge said band axially therefrom.

2. A rubber band stretching tool as described in claim 1 in which the trigger means comprises:
a. an elongated rockerlike trigger element pivotally mounted on said second handle and extending longitudinally of the latter;
b. a prying foot formed on the forward extremity of said trigger element and extending forwardly into close proximity to said external sleeve below said stressed band so that downward pressure on the rear extremity of said element will cause said prying foot to elevate said band above said sleeves.

3. A rubber band stretching tool as described in claim 1 having an annular flange concentrically surrounding and radially projecting from the lower extremity of said internal sleeve, said external sleeve frictionally riding or being supported by said flange in which the lower external annular edge of said flange is rounded so that said band can roll outwardly and upwardly onto said external sleeve as the band is being stressed by actuation of said handles.